(12) United States Patent
Lockyer

(10) Patent No.: US 9,631,512 B2
(45) Date of Patent: *Apr. 25, 2017

(54) GAS TURBINE OFFLINE COMPRESSOR WASH WITH BUFFER AIR FROM COMBUSTOR

(71) Applicant: Solar Turbines Incorporated, San Diego, CA (US)

(72) Inventor: John Frederick Lockyer, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 1122 days.

This patent is subject to a terminal disclaimer.

(21) Appl. No.: 13/756,342

(22) Filed: Jan. 31, 2013

(65) Prior Publication Data

US 2014/0209124 A1 Jul. 31, 2014

(51) Int. Cl.
*F01D 25/00* (2006.01)
*F02C 6/08* (2006.01)

(52) U.S. Cl.
CPC .............. *F01D 25/002* (2013.01); *F02C 6/08* (2013.01)

(58) Field of Classification Search
CPC .................................. F02C 6/08; F01D 25/002
See application file for complete search history.

(56) References Cited

U.S. PATENT DOCUMENTS

| | | | |
|---|---|---|---|
| 6,216,439 B1 | 4/2001 | Nakamoto | |
| 6,503,334 B2 * | 1/2003 | Ruiz | C23G 1/00 134/18 |
| 6,553,768 B1 | 4/2003 | Trewin et al. | |
| 6,659,715 B2 | 12/2003 | Kuesters et al. | |
| 6,932,093 B2 | 8/2005 | Ogden et al. | |
| 7,305,998 B2 | 12/2007 | Watt | |
| 7,373,781 B2 | 5/2008 | Reback et al. | |
| 7,827,795 B2 | 11/2010 | Hicks et al. | |
| 7,938,910 B2 | 5/2011 | Asplund et al. | |
| 7,997,057 B1 | 8/2011 | Harris et al. | |
| 8,245,952 B2 | 8/2012 | de la Bruere-Terreault et al. | |
| 8,778,091 B1 * | 7/2014 | Lockyer | F01D 25/002 134/22.1 |
| 2006/0213202 A1 * | 9/2006 | Fukutani | F01D 5/082 60/785 |

(Continued)

FOREIGN PATENT DOCUMENTS

| | | |
|---|---|---|
| JP | 06129260 | 10/1992 |
| WO | 2009141368 A1 | 11/2009 |

OTHER PUBLICATIONS

Kurz et al. "Gas Turbine Tutorial—Maintenance and Operating Practices Effects on Degradation and Life." Proceedings of the 36th Turbomachinery Symposium, pp. 173-185 (2007).

*Primary Examiner* — Alexander Markoff
(74) *Attorney, Agent, or Firm* — Procopio, Cory, Hargreaves & Savitch LLP

(57) ABSTRACT

A system and method for washing a gas turbine engine. The method for washing the gas turbine engine includes coupling a pressurized air supply assembly to an air supply and to a secondary air system, cranking a compressor rotor assembly of the gas turbine engine, supplying pressurized offline buffer air from the air supply to the pressurized air supply assembly, and spraying a cleaner into the compressor.

15 Claims, 5 Drawing Sheets

(56) References Cited

U.S. PATENT DOCUMENTS

| | | | |
|---|---|---|---|
| 2007/0059159 A1* | 3/2007 | Hjerpe | B08B 3/02 |
| | | | 415/117 |
| 2007/0062201 A1 | 3/2007 | Reback et al. | |
| 2008/0078422 A1 | 4/2008 | Wagner | |
| 2010/0139697 A1* | 6/2010 | Martens | C11D 7/3263 |
| | | | 134/22.19 |
| 2011/0083701 A1* | 4/2011 | Esmacher | F01D 25/002 |
| | | | 134/22.11 |
| 2011/0108062 A1 | 5/2011 | Stone et al. | |
| 2011/0173982 A1* | 7/2011 | Prociw | F02C 7/222 |
| | | | 60/739 |
| 2012/0134777 A1 | 5/2012 | Eleftheriou et al. | |
| 2012/0227414 A1 | 9/2012 | Lewis et al. | |
| 2014/0208762 A1* | 7/2014 | Lockyer | F01D 25/002 |
| | | | 60/772 |

* cited by examiner

— 1 —
GAS TURBINE OFFLINE COMPRESSOR WASH WITH BUFFER AIR FROM COMBUSTOR

TECHNICAL FIELD

The present disclosure generally pertains to a water wash system for a gas turbine engine, and is more particularly directed toward an offline crank wash system for a gas turbine engine.

BACKGROUND

Over a period of operating time the compressor section of a gas turbine engine may accumulate deposits of ingested material and consequently become dirty. Dirt build up in the compressor will reduce its efficiency; this results in a poorer overall engine efficacy and therefore power output. Accordingly, the compressor requires periodic cleaning (sometimes referred to as "water wash"). There are primarily three types of wash systems: on-line wash system, offline crank wash system, and manual wash system. On-line washing basically consists of a process where by a cleaning fluid is sprayed into the air intake of the engine while running at full speed and loaded. Here, demineralized water is used and the droplets are sized to be large enough so that the drag forces are dominated by the inertia forces that tend to cause the droplets to impinge on the hardware of the compressor and provide the cleaning action. Offline washing is wherein the gas turbine engine spun by an external crank. Manual washing is where the gas turbine engine is shut down, and the gas turbine engine's components are washed manually.

U.S. Pat. No. 6,659,715 issued to Kuesters et al. on Dec. 9, 2003 shows an axial compressor and method of cleaning an axial compressor. In particular, the disclosure of Kuesters et al. is directed toward an axial compressor that includes a nozzle for injecting a cleaning fluid. The cleaning fluid is injected through the nozzles in a flow duct during operation, so that rear blading rows are also cleaned.

The present disclosure is directed toward overcoming known problems and/or problems discovered by the inventors.

SUMMARY OF THE DISCLOSURE

A pressurized air supply assembly for a gas turbine engine, is disclosed herein. The pressurized air supply assembly for a gas turbine engine includes an air conduit, a secondary air system pneumatic couple coupled to one end of the air conduit, the secondary air system pneumatic couple including an adapter configured to attach to a part of the secondary air system, the pressurized air supply assembly further including a local air supply adapter including a conduit mount and an injector port flange, the conduit mount coupled to the second end of the air conduit, the injector port flange configured to fit and attach to the injector port, the injector port flange forming a cap over the injector port with at least one air passageway passing through the cap and terminating at the conduit mount.

According to one embodiment, a method for washing a compressor in a gas turbine engine is also disclosed herein. The method for washing the compressor in the gas turbine engine includes removing an injector from an injector port of the gas turbine engine, installing a local air supply adapter to the injector port, where the local air supply adapter is part of a pressurized air supply assembly, and the gas turbine engine is an air supply. The method further includes coupling the pressurized air supply assembly to a secondary air system of the gas turbine engine, cranking a compressor rotor assembly of the gas turbine engine, supplying offline buffer air to the secondary air system from the air supply and via the pressurized air supply assembly, and delivering cleaner to the compressor.

According to another embodiment, a method for washing a gas turbine engine is also disclosed herein. The method for washing the gas turbine engine includes removing an injector from an injector port, installing a local air supply adapter to the injector port, cranking the compressor of the gas turbine engine, distributing a cleaner into the compressor; and supplying compressed air to a secondary air system of the gas turbine engine from the local air supply adapter.

DETAILED DESCRIPTION

The present disclosure relates to an air buffering system for a compressor water wash operation of a gas turbine engine. The compressor water wash is a maintenance operation performed to clean deposits from the compressor for improved efficiency. The present disclosure provides an air buffering system that taps into the compressor air from the compressor through the injector ports in the combustor. The compressed air is generated and supplied to the combustor chamber as a result of the compressor being cranked (at a fraction of operating speed) during the wash. The compressed air is then rerouted to the bearing assemblies' buffer lines and to the cooling passages through the secondary air system. The high volume of air can enable the buffering of multiple bearing assemblies and turbine cooling passages, and can mitigate the need for shop air on site.

Figure 1:
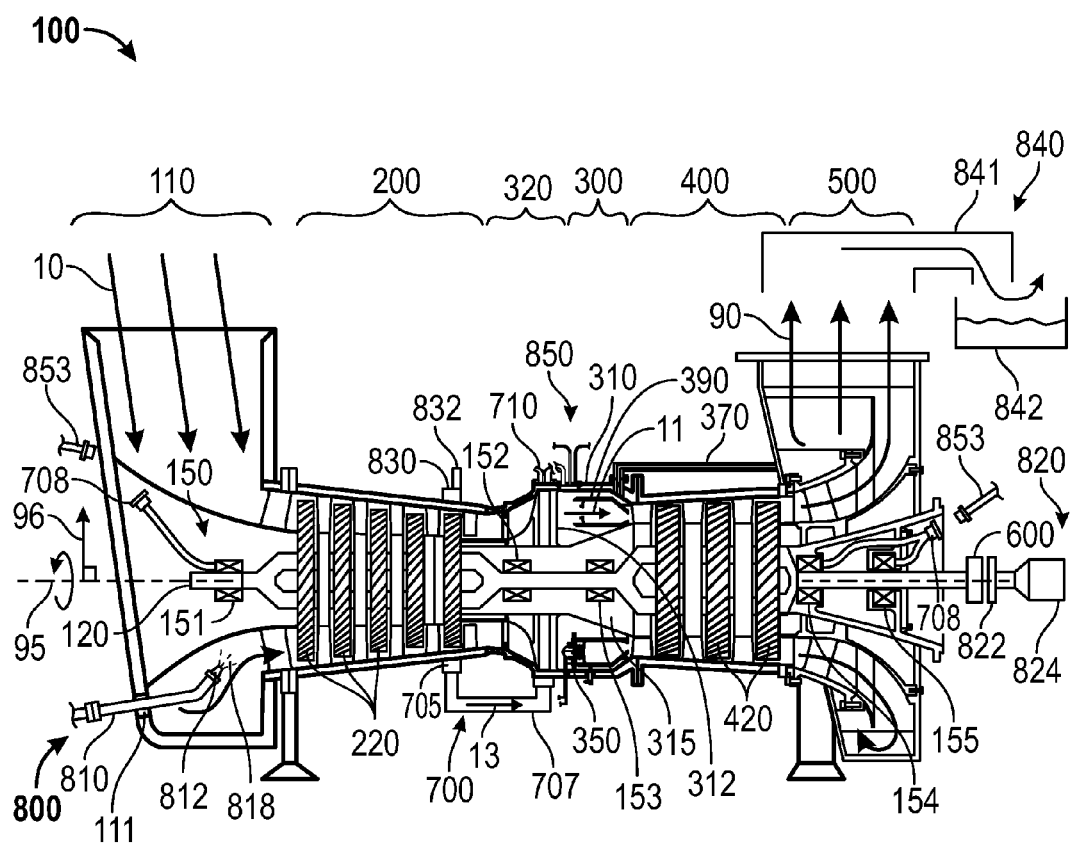
FIG. 1 illustrates a portion of a wash system for washing a compressor in a gas turbine engine, including a cut away side view of an exemplary gas turbine engine.

FIG. 1 schematically illustrates a portion of a wash system for washing a compressor in a gas turbine engine, including a cut away side view of an exemplary gas turbine engine. In particular, the wash system 800 for washing a compressor in a gas turbine engine integrates with, and makes use of, features of the gas turbine engine 100 itself. As such, several exemplary features of the gas turbine engine 100 will be initially discussed for context. In addition, here and in other figures, some of the surfaces have been left out, repositioned, simplified, and/or exaggerated for clarity and ease of explanation.

Also, the present disclosure may use the gas turbine engine 100 for orientation purposes. In particular, the disclosure may reference a center axis 95 of rotation of the gas turbine engine 100, which may be generally defined by the longitudinal axis of its shaft 120. Thus, all references to radial, axial, and circumferential directions and measures refer to the center axis 95, unless specified otherwise, and terms such as "inner" and "outer" generally indicate a lesser or greater radial distance from the center axis 95, wherein a radial 96 may be in any direction perpendicular and radiating outward from center axis 95. Furthermore, the disclosure may generally reference a forward and an aft direction, where references to "forward" and "aft" are associated with the axial flow direction of primary air 11 (i.e., air used in the combustion process), unless specified otherwise. For example, forward is "upstream" relative to the flow of primary air 11, and aft is "downstream" relative to the flow of primary air 11.

Regarding the exemplary gas turbine engine 100, generally, the gas turbine engine 100 includes an inlet 110, a compressor 200, a combustor 300, a turbine 400, an exhaust 500, and a power output coupling 600. The compressor 200 includes one or more rotating compressor rotor assemblies 220 populated with compressor blades. The turbine 400 includes one or more rotating turbine rotor assemblies 420 populated with turbine blades.

The gas turbine engine 100 may also includes a starter configured to rotate the rotating components without combustion. The starter may be mechanically coupled to the shaft 120 at the power output coupling 600, or at any other convenient location.

One or more of the rotating components are coupled to each other and driven by one or more shafts 120. The one or more shafts 120 are supported by a plurality of bearing assemblies 150, which may be identified in any convenient manner. For example, the gas turbine engine 100 may include a number one bearing assembly 151, a number two bearing assembly 152, a number three bearing assembly 153, a number four bearing assembly 154, and a number five bearing assembly 155. One or more of the bearing assemblies 150 may include dry seals such as buffered labyrinth seals 170 (see FIG. 2), which use a combination of a tortuous escape path and pressurized buffer air (secondary air 13) to inhibit lubricants from escaping their designated "wet" areas (i.e., the lubricated side of the lubricant seal).

As illustrated, the combustor 300 may include a combustor case 310, an internal combustor strut ("strut") 312, a bearing housing 315, a diffuser 320, an injector 350 and a combustion chamber 390 or "liner". In addition, the combustor 300 may include a combustor case bleed 370 and a combustor case bleed valve 372 (see FIG. 2). When the combustor case bleed valve 372 is open (e.g., during engine start up) the combustor case bleed 370 acts as a turbine bypass that ducts primary air 11 from the combustor 300 directly to the exhaust 500, relieving back pressure on the compressor 200. For clarity and illustration purposes, only one injector 350 is shown here in the installed position and only one combustor case bleed 370 is shown. Also, here, and in other figures, the struts 312 and injectors 350 have been rotated and/or repositioned to align with the view, for clarity and ease of explanation.

Depending on its configuration, the combustor 300 may include one or more of the above components. For example, the combustor 300 may include a plurality of injectors 350 annularly distributed around the center axis 95 (see FIG. 4). Similarly, the combustor 300 may be configured to include a several, annularly distributed struts 312, the struts 312 radially extending between the bearing housing 315 and the combustor case 310.

In operation, air 10 enters the gas turbine engine 100 via its inlet 110 as a "working fluid", and is compressed by the compressor 200. In the compressor 200, the working fluid is compressed by the series of compressor rotor assemblies 220. In particular, the air 10 is compressed in numbered "stages", the stages being associated with each compressor rotor assembly 220. For example, "4th stage air" may be associated with the 4th compressor rotor assembly 220 in the downstream or "aft" direction. While only five stages are illustrated here, the compressor 200 may include many more stages.

When compressed, air 10 may be used as needed: for combustion, for cooling, for pressurization, etc. In particular, the compressed air 10 may be divided into primary air 11 and secondary air 13. Primary air 11 is used in the combustion process. Primary air 11 is discharged from the compressor 200, enters the combustor 300 for combustion, drives the turbine 400, and exits the gas turbine engine 100 from the exhaust 500 as exhaust gas 90.

Secondary air 13 is air provided throughout gas turbine engine 100 via a secondary air system 700 (or "bleed system") for auxiliary uses such as internal cooling, pressurized buffer sealing, etc. In particular, the secondary air system 700 may tap one or more stages of compressor 200 and route the pressurized secondary air 13 via any combination of ducting, internal passageways, interstices between components, and any other air channels or secondary air plumbing 707.

To illustrate, secondary air system 700 may include one or more compressor ports 705 that tap the compressor at one or more locations. The compressor ports 705 are pneumatically coupled to the secondary air plumbing 707. The secondary air plumbing 707 can then distribute secondary air 13 as needed. For example, secondary air plumbing 707 may pneumatically couple with a strut bleed tube external flange assembly 710 and provide compressed secondary air 13 into one or more struts 312 of combustor 300. Also for example, secondary air plumbing 707 may pneumatically couple with one or more buffer air fittings 708 and provide compressed secondary air 13 the "end" bearing assemblies (e.g., number one, four, and five bearing assemblies 151, 154, 155).

The secondary air system 700 may further include a network of air flow paths configured to distribute and deliver secondary air 13 at different pressure levels. For example, intermediate pressure secondary air 13 may be ported from an intermediate stage (e.g., 6th stage air) of the compressor 200 via intermediate pressure secondary air plumbing 707. In addition, high pressure secondary air 13 may be ported from a subsequent or final stage of the compressor 200 via high pressure or PCD (pressure at compressor discharge) secondary air plumbing 707. Different and/or additional stages may be tapped as a compressed air supply.

Furthermore, secondary air 13 may be used for a first purpose, and subsequently recovered and/or reused for a second purpose. In particular, the secondary air system 700 may recover "mixed air" (i.e., air that has been "used" or otherwise exposed to lubricants and/or other "contaminants") from air passageways throughout the gas turbine engine 100 for post-processing, reuse, etc. For example, used seal buffer air (mixed air) may be captured within or proximate the bearing housing 315, and routed out of the combustor 300 via one or more strut 312 to the turbine 400 (e.g., for cooling or buffering).

Turning to the system for washing a compressor in a gas turbine engine, the wash system 800 includes a sprayer 810 and a crank 820. In particular, the sprayer 810 introduces cleaner 818 into the compressor 200 and the crank 820 rotates the compressor rotor assemblies 220. The wash system 800 may further include one or more secondary air caps 830 and/or a waste trap 840.

The sprayer 810 may include one or more nozzles 812 configured to deliver the cleaner 818 into the compressor 200. The cleaner 818 may include a chemical cleaner (e.g., solvent) and/or a physical cleaner (e.g., water with predetermined droplet size). The one or more nozzles 812 may be configured to meter the quantity and/or quality (i.e., droplet size, spray angle, cleaner-to-air ratio, etc.) of the cleaner 818 introduced to the compressor 200. Also, the one or more nozzles 812 may deliver the cleaner 818 into the compressor 200 via applied pressure or resultant pressure (i.e., lowered pressure at the outlet of the nozzle 812, venturi effect).

According to one embodiment, the sprayer 810 may be configured to deliver the cleaner 818 into the compressor 200 via the inlet 110 of the gas turbine engine 100. Moreover, the sprayer 810 may be configured to extend into the inlet 110 downstream of an air filter. For example, the sprayer 810 may include an elongated member configured to extend one or more nozzles 812 into the inlet 110. Also, for example, the sprayer 810 may include an extension tube that is generally linear, and which can be conveniently inserted into an access port 111 of the inlet 110 and manipulated so as to distribute the cleaner 818 throughout the inlet 110.

According to one embodiment, the sprayer 810 may be fixed to the inlet 110. In particular, the sprayer 810 may be attached to the inlet 110 such that user manipulation is not required. In addition, the sprayer 810 may be removable or integrated into the inlet 110. For example, the sprayer 810 may include a tube having multiple nozzles 812 strategically positioned in and attached to the inlet 110. The tube may be ring-shaped or otherwise shaped to conform to the inlet 110, extending the entire circumference or a part thereof. Also for example, the sprayer 810 may include multiple nozzles 812 integrated directly into, and distributed throughout the inlet 110 and/or the compressor 200.

According to one embodiment, the sprayer 810 may be configured to deliver a rinse. In particular, the sprayer 810 may also introduce a rinsing agent into the compressor 200 via the inlet 110 of the gas turbine engine 100. The rinse may be water that is demineralized, or otherwise purified, and selected so as to rinse the cleaner 818 and/or any residue. The sprayer 810 may deliver the rinse using the same delivery path as the cleaner 818 or a separate path. For example, the sprayer 810 may include a selectable feed where cleaner 818 and rinse can be alternately delivered via one or more nozzles 812. Also, for example, the sprayer 810 may include an independent delivery path and nozzles 812 for the cleaner 818, and for the rinse. Finally, the cleaner 818 and the rinse may differ only in the timing of their delivery.

The crank 820 includes a drive couple 822 to the compressor rotor assemblies 220 and a driver 824 configured to rotate the compressor rotor assemblies 220 via the drive couple 822. In particular, the crank 820 rotates the compressor rotor assemblies 220 without combustion in the combustion chamber 390 or fuel delivery to the injectors 350. Also, the drive couple 822 need not be directly connected to the compressor rotor assemblies 220. For example, the drive couple 822 may be coupled to an intermediated drive member such as the power output coupling 600, the shaft 120, etc.

According to one embodiment, the crank 820 may be a starter motor of the gas turbine engine 100. In particular, the starter motor may be used to crank the gas turbine engine 100 as part of an offline wash. As such, the starter motor of the gas turbine engine 100 may be operated to rotate the compressor rotor assemblies 220 while the fuel supply is shut off, or otherwise inhibited. In addition, the starter motor of the gas turbine engine 100 may be configured to selectably operate in both an offline wash mode and in an engine start-up mode.

Alternately, the crank 820 may include a driver 824 separate from the gas turbine engine 100. In particular, the driver 824 may be independent of the starter of the gas turbine engine 100, but otherwise mechanically coupled to the compressor rotor assemblies 220. For example, the crank 820 may include a driver 824 coupled to the compressor rotor assemblies 220 via the power output coupling 600 and/or the shaft 120.

The driver 824 may be an electric motor, a pneumatic motor, or any convenient driving device. Moreover, the driver 824 may separable from the gas turbine engine 100, and only used as part of the wash system 800. Alternately, the driver 824 may be persistently coupled to the gas turbine engine 100, such as a system normally driven by the power output coupling 600 (e.g., an electric generator re-configured to operate as an electric motor).

The one or more secondary air caps 830 are caps configured to interface with and cap off the one or more compressor ports 705, one or more ports of the strut bleed tube external flange assembly 710, and/or other openings of the secondary air plumbing 707 made upon the removal of the secondary air plumbing 707 for engine wash. Accordingly, the one or more secondary air caps 830 may include the same or similar interface fitting of the removed secondary air plumbing 707.

According to one embodiment, one or more of the secondary air caps 830 may include a bleed vent 832. In particular, the secondary air cap 830 configured to cap off the compressor port 705 may include a bleed vent 832. For example, the bleed vent 832 may be a quick release type. Moreover, the bleed vent 832 may be configured to cap off the compressor port 705 yet be opened and closed while pressurized and/or unpressurized.

The waste trap 840 collects and/or redirects used cleaner 818 from the wash system 800. For example, the waste trap 840 may include an exhaust collector 841 and waste separator 842. In particular, exhaust collector 841 may be any convenient duct, such as a hood configured to direct flow from the exhaust 500 to the waste separator 842. Also for example, the waste separator 842 may be any convenient catch, such as an open fluid container configured to receive waste and/or rinse liquid, and permit gas to escape. Alternately, the wash system 800 may use existing exhaust paths to direct flow from the exhaust 500, for example when the cleaner 818 is water.

Figure 2:
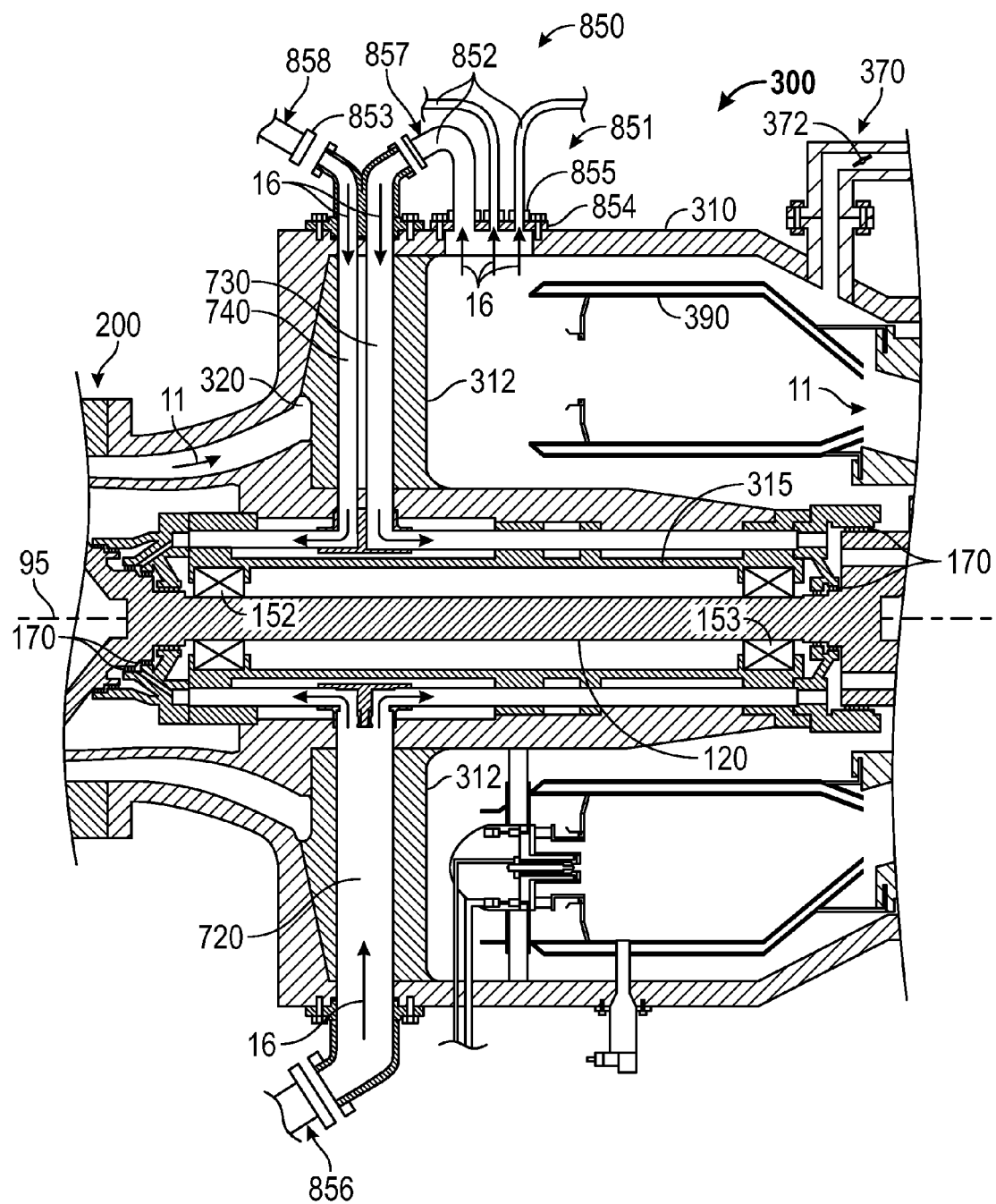
FIG. 2 illustrates a portion of the wash system of FIG. 1, where the gas turbine engine is configured for angled injectors.

FIG. 2 illustrates a portion of the wash system of FIG. 1. In particular, buffer air portions are shown. Moreover, the wash system 800 integrates with the secondary air system 700 of the gas turbine engine 100 providing compressed air from onboard and/or off board the gas turbine engine 100. As such, exemplary aspects of the secondary air system 700 and the injectors 350 will be initially discussed for context. Note, for clarity, repeated or similar components may only be called out at in a single location in the figure.

Although other types of injectors may be used, here, the gas turbine engine 100 is configured for angled injectors. In particular, the injectors 350 are 90-degree injectors, radially entering the combustor 300. For example, the injectors 350 may be radially distributed around the center axis 95, and mounted at one end to the combustor case 310 and at the other end to the combustion chamber 390. Here, and in other figures, the injectors 350 have been removed and/or repositioned to align with the view for clarity and ease of explanation.

As discussed above, combustor 300 may include a plurality of struts 312, providing radial support between the bearing housing 315 and the combustor case 310. As illustrated, struts 312 may be placed in the air stream of diffuser 320, radially distributed, and positioned between adjacent gas turbine injectors 350. For example, each strut 312 may be radially distributed such that radially adjacent struts 312 are separated by two injectors.

In addition to providing radial support, struts 312 provide internal passageways traversing the pressurized flow regions inside combustor 300, shielded from interaction with primary air 11. In particular, one or more passageways may be provided within the walls of strut 312 for carrying secondary air 13, mixed air, lubricants, and/or other media between the outside of the combustor case 310 and the internal regions of the gas turbine engine 100 (e.g., inside or nearby the bearing housing 315). Accordingly, portions of the secondary air system 700 may pass through one or more struts 312.

As illustrated, the secondary air system 700 of the gas turbine engine 100 may include a buffer air path 720, a cooling air path 730, and/or a mixed air path 740. In normal operation, the buffer air path 720 delivers compressed secondary air 13 to one or more dry seals (e.g., buffered labyrinth seals 170). The buffer air inhibits the undesired travel of lubricant from "wet" areas. Also, in normal operation, the cooling air path 730 delivers compressed secondary air 13 to one or more cooling passages (e.g., cooling passages traversing the various turbine rotor assemblies 420). Also, in normal operation, the mixed air path 740 collects mixed air (e.g., proximate a bearing seal) and routes it away.

As discussed above, the secondary air system 700 may include one or more strut bleed tube external flange assemblies 710. In particular, the strut bleed tube external flange assemblies 710 interface with combustor 300 such that the secondary air plumbing 707 may transmit secondary air 13 and/or mixed air to/from the buffer air path 720, the cooling air path 730, and/or the mixed air path 740 during normal operation.

Turning to the compressor wash, the wash system 800 further includes a pressurized air supply assembly 850. The pressurized air supply assembly 850 generally includes one or more of an air supply pneumatic couple and a secondary air system pneumatic couple 853 coupled to each end of an air conduit 852. The pressurized air supply assembly 850 is configured to provide offline buffer air 16 to one or more areas of the gas turbine engine 100. The offline buffer air 16 may come from "shop air" (i.e., an air supply other than the gas turbine engine 100), "local air" (i.e., primary air 11 compressed by the gas turbine engine 100), or a combination thereof. The offline buffer air 16 may be used to buffer against egress of lubricants or ingress of contaminants, as described below.

The air supply pneumatic couple may include any convenient pneumatic coupling configured to join with the source of offline buffer air 16. In particular, where the offline buffer air supply is "shop air", the air supply pneumatic couple may be a standardized air fitting (not shown). For example, the air supply pneumatic couple may be a quick-disconnect hand operable air-line fitting. In addition, when configured to receive "shop air" the air supply pneumatic couple may include a one-to-many or many-to-one manifold, and or multiple air supply pneumatic couples.

Alternately, where the offline buffer air supply is the gas turbine engine 100 ("local air"), the air supply pneumatic couple may include a local air supply adapter 851 configured to interface with an opening downstream of the compressor 200. In particular, the local air supply adapter 851 pneumatically couples with the primary air flow path. For example, the local air supply adapter 851 may include ported plug that inserts into a preexisting port of the combustor 300, such as an injector port, starter torch port, combustor case bleed port, etc.

According to one embodiment, the local air supply adapter 851 may interface with an injector port and include an injector port flange 854 and a conduit mount 855. In particular, the injector port flange 854 and the conduit mount 855 may form a structure that fits and attaches in the place of a removed injector 350 and provides an air path to the air conduit 852. For example, the injector port flange 854 may be a cap, shaped substantially similar to the mounting flange of the removed injector 350, but including one or more air passageways passing through the cap and terminating at the conduit mount 855. The conduit mount 855 may be an interface and/or a fitting, configured to mate with the air conduit 852 in a permanent or removable manner.

According to one embodiment, the local air supply adapter 851 may include a plurality of conduit mounts 855. In particular, where offline buffer air 16 is routed in various locations throughout the secondary air system 700, a single injector port flange 854 may include a plurality of conduit mounts 855 to support each path. For example, as illustrated the air local air supply adapter 851 may include three conduit mounts 855, having different sizes and coupling to three different air conduits 852. The three different air conduits 852 of the illustrated local air supply adapter 851 may route offline buffer air 16 to various locations of the buffer air path 720.

The air conduit 852 may include pneumatic conduit of any convenient shape or configuration. In addition, the air conduit 852 may be of a fixed shape or may be flexible. For example, the air conduit 852 may be a flexible air-line with smooth Teflon bore. Also for example, the air conduit 852 may additional environmental features such as mesh shielding.

Moreover, where multiple air conduits 852 are used, each may have varying lengths and inner diameters. In particular, each air conduit 852 may have a different length and/or inner diameter, depending on which part of the secondary air system 700 it is integrating with. For example, the air conduits 852 may include air-lines of different lengths, going to the "end" bearing assemblies, and air-lines going into the combustor 300 via one or more struts 312.

According to one embodiment, the air conduits 852 may have varying inner diameters different from one another. In particular, the air conduits 852 integrating with buffer air paths 720, and/or mixed air paths 740 may have different inner diameters than those integrating with cooling air paths 730. For example, the air conduits 852 integrating with buffer air paths 720, and/or mixed air paths 740 may have a first inner diameter and those integrating with cooling air paths 730 may have a second inner diameter larger than the first. Also, for example, the first inner diameter may be 0.75 inch (19 mm) and the second inner diameter may be 1.25 inch (32 mm).

The secondary air system pneumatic couple 853 may include any convenient pneumatic fitting or adapter configured to attach to the part of the secondary air system 700 it is integrating with. In particular, secondary air system pneumatic couple 853 may include multiple attachments of differing sizes, coupling to different secondary air paths. Moreover, the inner diameter of each secondary air system pneumatic couple 853 may vary with each air conduit 852 coupled to it, as described above. In addition, each secondary air system pneumatic couple 853 may be shaped substantially similar to the mounting flange of the part of the removed secondary air plumbing.

As discussed above, the secondary air system 700 may conveniently include one or more strut bleed tube external flange assemblies 710. Accordingly, with one or more sections of the secondary air plumbing 707 removed, the pressurized air supply assembly 850 may pneumatically couple with the corresponding secondary air system interface. In particular, the secondary air system pneumatic couple 853 may be joined to the strut bleed tube external flange assembly 710, using any convenient attachment.

According to one embodiment, secondary air system pneumatic couples 853 may include attachments for one or more different air paths of the secondary air system 700. In particular, secondary air system pneumatic couple 853 may include a buffer air path attachment 856 configured to couple with the buffer air path 720, a cooling air path attachment 857 configured to couple with the cooling air path 730, and/or a mixed air path attachment 858 configured to couple with the mixed air path 740.

For example, the buffer air path attachment 856 may couple with a port of the strut bleed tube external flange assembly 710 associated with buffered labyrinth seals 170 of the "intermediate" bearing assemblies 150 (e.g., number two and three bearing assemblies 152, 153 in the bearing housing 315). The buffer air path attachment 856 may also couple with the buffer air fittings 708 (see FIG. 1) for the buffered labyrinth seals 170 of the end bearing assemblies 150. Also for example, the cooling air path attachment 857 may couple with a port of the strut bleed tube external flange assembly 710 associated with cooling to the turbine 400. Also for example, the mixed air path attachment 858 may couple with a port of the strut bleed tube external flange assembly 710 associated with mixed air leaving the bearing housing 315.

Figure 3:
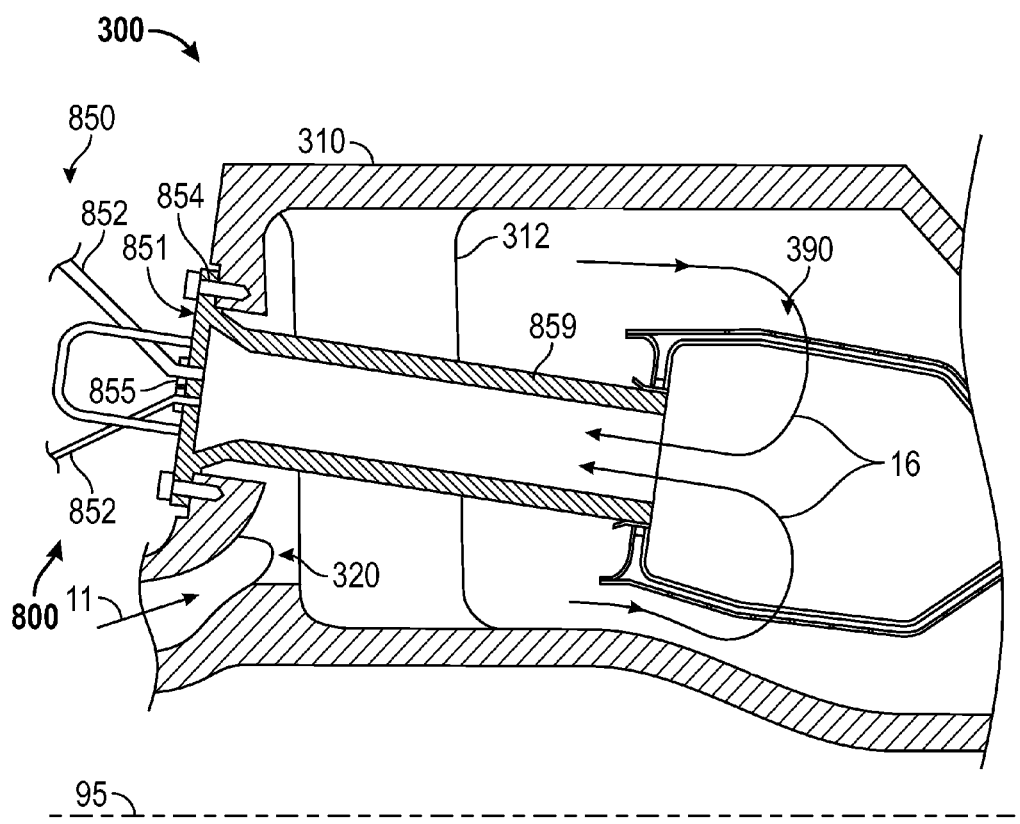
FIG. 3 illustrates a portion of the wash system of FIG. 1, where the gas turbine engine is configured for straight injectors.

FIG. 3 illustrates a portion of the wash system 800, where the gas turbine engine 100 is configured for straight injectors. In particular, the combustor 300 is configured for 180-degree injectors entering the combustor 300 in a generally axial direction. As with the 90-degree injectors, the 180-degree injectors may be radially distributed around the center axis 95. Also, the 180-degree injectors may be mounted at one end to the combustor case 310, and at the other end to the combustion chamber 390.

According to one embodiment, the wash system 800 may draw offline buffer air 16 from within the compressor 200, and/or provide a more tortuous path for wash contaminants to enter the pressurized air supply assembly 850. In particular, the pressurized air supply assembly 850 may further include an air supply extension 859. The air supply extension 859 begins at the injector port flange 854 and extends into the combustor 300. For example, the air supply extension 859 may be a tube, of any cross section extending into the combustor 300 from the injector port flange 854.

According to one embodiment, the air supply extension 859 may extend to or into the combustion chamber 390. In particular, the air supply extension 859 may extend to and mates with an injector opening in the combustion chamber 390. For example, the air supply extension 859 may have a substantially the same shape and interface dimensions of a removed injector. Moreover, the air supply extension 859 may be fit up or otherwise configured to require offline buffer air 16 to first enter the combustion chamber 390 in order to enter the air supply extension 859.

Figure 4:
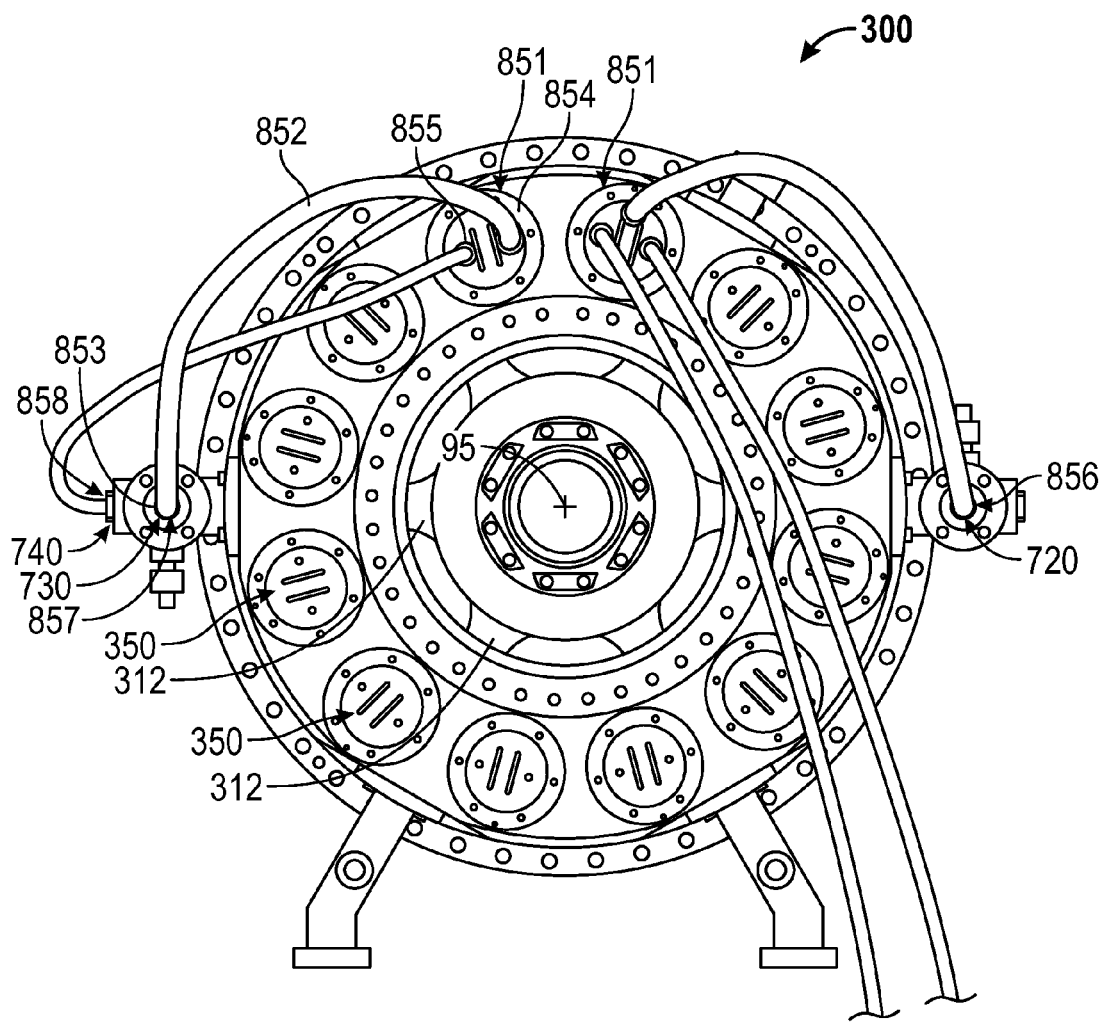
FIG. 4 illustrates a portion of the wash system of FIG. 1, including an axial view of the combustor region of FIG. 3.

FIG. 4 illustrates a portion of the wash system 800 of FIG. 1, including an axial view of the combustor region of FIG. 3. In particular, the view includes the combustor 300 looking aft (from the compressor side). As illustrated and discussed above, the struts 312 and the injectors 350 annularly distributed around the center axis 95. Here, however, the gas turbine engine 100 is configured for straight injectors. While this configuration differs from that of angled injectors (entering radially), the illustrated embodiments apply to both.

According to one embodiment, the local air supply adapter 851 may include a plurality of injector port flanges 854 and/or conduit mounts 855. In particular, where a plurality of injectors 350 are removed, each injector port may be capped and tapped. For example, as illustrated, the local air supply adapter 851 may include a first injector port flange 854 and a second injector port flange 854. Moreover, the first injector port flange 854 and a second injector port flange 854 may be coupled to injector ports in the upper half of the combustor 300. For example and as illustrated, the first injector port flange 854 and a second injector port flange 854 may be installed in the two uppermost injector ports of the combustor 300.

According to one embodiment, the local air supply adapter 851 may route the offline buffer air 16 to various locations with each injector port flange 854 including a plurality of conduit mounts 855. In particular, each injector port flange 854 may include a plurality of independent air paths. For example, the first and second injector port flange 854 may include two and three conduit mounts 855, respectively, having various sizes and coupling to five different air conduits 852. The five different air conduits 852 may then route offline buffer air 16 to buffer air paths 720 of the end and intermediate bearing assemblies 150, to the cooling air path 730, and to the mixed air path 740.

INDUSTRIAL APPLICABILITY

The present disclosure generally pertains to a wash system for a gas turbine engine, and is applicable to the use, operation, maintenance, repair, and improvement of gas turbine engines. The wash system embodiments described herein may be suited for gas turbine engines any number of industrial applications, such as, but not limited to, various aspects of the oil and natural gas industry (including transmission, gathering, storage, withdrawal, and lifting of oil and natural gas), power generation industry, aerospace and transportation industry, to name a few examples.

Furthermore, the described embodiments are not limited to use in conjunction with a particular type of compressor or gas turbine engine. There are numerous gas turbine engine configurations and types that are applicable here. For example, the compressor may be an axial compressor, a centrifugal compressor, etc., having one or more compression stages. Also for example, the gas turbine engine may be single shaft, multi-shaft, having any number of bearing assemblies, any type of combustor configuration, and/or may operate on one or more different fuels. The gas turbine engine is not limited in size or output, and may be rated at 3000 kW power output or greater. In addition, compressor wash system may be used in any the gas turbine engine having a secondary air system.

Generally, embodiments of the presently disclosed wash system are applicable to the use, operation, maintenance, repair, and improvement of gas turbine engines, and may be used in order to improve performance and efficiency, decrease maintenance and repair, and/or lower costs. In addition, embodiments of the presently disclosed compressor wash system may be applicable at any stage of the gas turbine engine's life, from design to prototyping and first manufacture, and onward to end of life.

Figure 5:
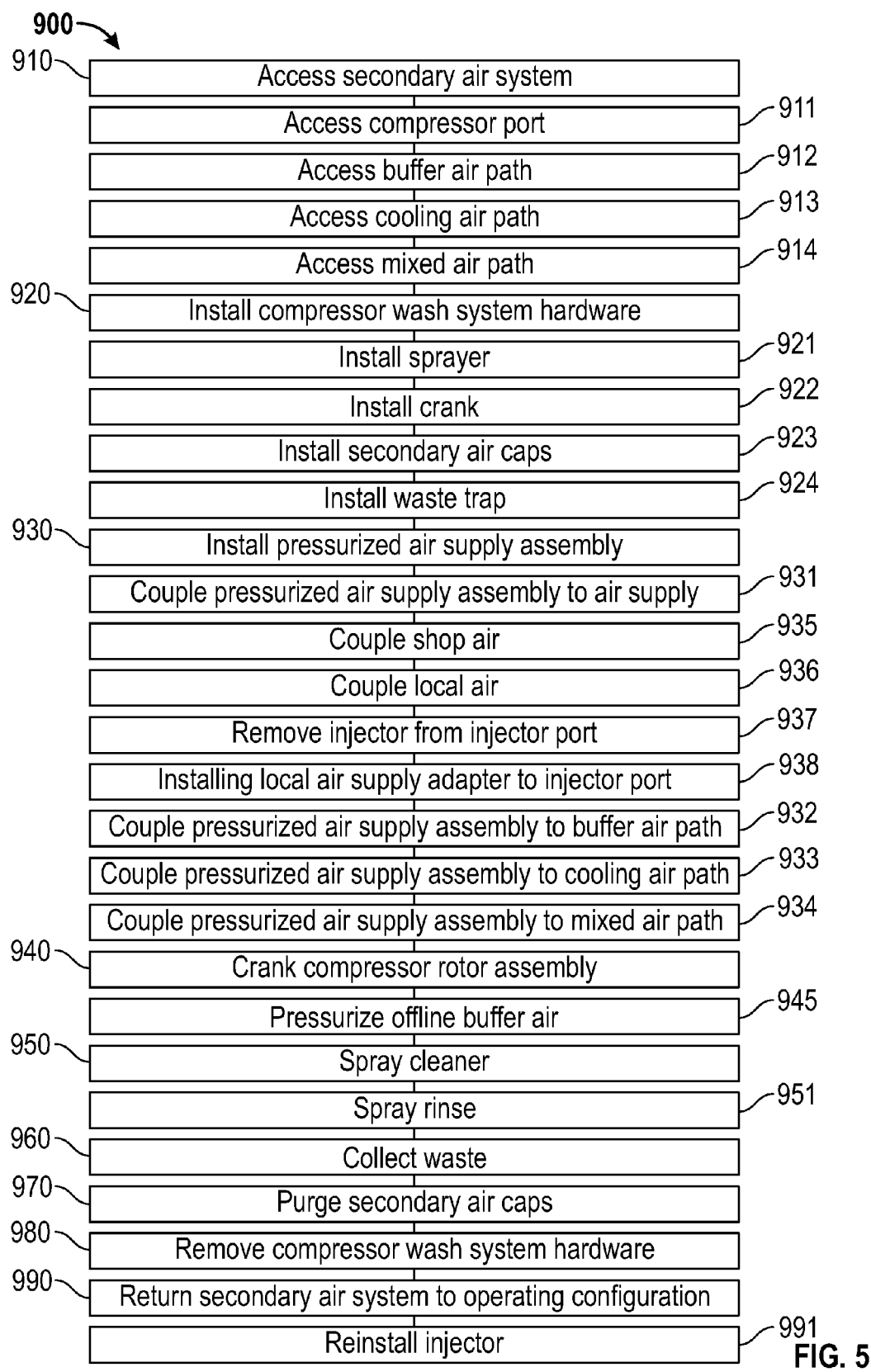
FIG. 5 is a flow chart of an exemplary method for washing a gas turbine engine.

FIG. 5 is a flow chart of an exemplary method for washing a gas turbine engine. In particular, the compressor and/or any other components in the primary air flow path may be washed using the following method 900, the above description, or a combination thereof. As illustrated (and with reference to FIG. 1 through FIG. 4), the components in the primary air flow path may be washed and rinsed while the gas turbine is offline by operating the disclosed wash system.

The method 900 begins with setting up the wash system. In particular, the wash system may include the wash system 800 described above. Also, setting up the wash system includes accessing the secondary air system of the gas turbine engine at step 910 and installing wash system hardware at step 920.

Accessing the secondary air system of the gas turbine engine 910 may include accessing a compressor port at step 911, accessing a buffer air path at step 912, accessing a cooling air path at step 913, and/or accessing a mixed air path at step 914. In particular, the steps of accessing the compressor port 911, accessing the buffer air path 912, accessing the cooling air path 913, and/or accessing the mixed air path 914 may include removing secondary air plumbing, or otherwise obtaining pneumatic access to the compressor port, the buffer air path, the cooling air path and the mixed air path, respectively. For example, removing secondary air plumbing may provide both access to the underlying port or air path and a mating mounting flange.

Moreover, accessing each port or air path above may be made at one or more locations. For example, accessing the compressor port at step 911 may include decoupling secondary air plumbing at multiple compressor stages and/or at multiple compressor ports distributed around the compressor. Also for example, accessing the buffer air path at step 912 may include decoupling secondary air plumbing for seals at each bearing assembly, including end bearing assemblies and intermediate bearing assemblies. Similarly, accessing the cooling air path at step 913 or the mixed air path at step 914 may include decoupling secondary air plumbing at a convenient location, such as outside the combustor at one or more strut tube external flange assemblies.

Installing wash system hardware at step 920 may include the steps of installing a sprayer 921, installing a crank 922, installing a secondary air cap 923, installing a waste trap 924, and/or installing a pressurized air supply assembly 930. One or more of each of this hardware may be installed. In addition, one or more of these may be preinstalled. For example, as discussed above the sprayer or the crank may be integrated into, or persistently installed on the gas turbine engine. Similarly, the waste trap may be integrated into or persistently installed on the gas turbine engine.

Installing the secondary air cap 923 includes capping off one or more compressor ports. In particular, air is prevented from advancing in the secondary air system beyond the secondary air cap. For example, where the compressor includes one or more compressor ports, as described above, each port may be capped off with a secondary air cap. Alternately, one or more secondary air caps may be installed at a more convenient downstream location.

According to one embodiment, the one or more secondary air caps may be installed downstream of a flow juncture or reducing manifold. In particular, where there are multiple ports off the compressor pneumatically joined via a gallery or other flow junction and pneumatically reduced to fewer outputs, the fewer outputs may be capped rather than the multiple ports. This may be beneficial in reducing the number of secondary air cap, installation time expended, and for ease of installation.

The step 930 of installing the pressurized air supply assembly may include the steps of coupling the pressurized air supply assembly to an air supply 931, coupling the pressurized air supply assembly to the buffer air path 932, coupling the pressurized air supply assembly to the cooling air path 933, and/or coupling the pressurized air supply assembly to the mixed air path 934. Coupling the pressurized air supply assembly to each air path 932, 933, 934 may include coupling one or more secondary air system pneumatic couples to each accessed air path, or otherwise pneumatically coupling the pressurized air supply assembly to each air path 932, 933, 934. For example, one or more secondary air system pneumatic couples may be mated with each previously accessed mounting flange associated with each air path to be coupled with.

Coupling the pressurized air supply assembly to an air supply a step 931 may include coupling to "shop air" 935 and/or coupling to "local air" 936. In particular, coupling to "shop air" 935 may include coupling an air supply pneumatic couple such as a standardized air fitting to an air supply other than the gas turbine engine, as described above. According to embodiment, the "shop air" may be depressurized at the time of coupling, and subsequently pressurized.

The step coupling to "local air" 936 may include coupling an air supply pneumatic couple such as a local air supply adapter configured to interface with an opening downstream of the compressor, as described above. In particular, coupling to "local air" 936 may include removing an injector from an injector port 937 and installing the local air supply adapter to the injector port 938. Installing the local air supply adapter to the injector port 938 may include installing an injector port flange, as described above, to the open injector port. According to another embodiment, more than one injector may be removed and more than one local air supply adapter may be installed.

According to one embodiment, installing the local air supply adapter to the injector port 938 may further include installing the local air supply adapter into a combustion chamber. For example, the local air supply adapter may include an air supply extension, as described above, and installing local air supply adapter into a combustion chamber may include extending the air supply extension into an injector opening in the combustion chamber.

According to one embodiment, coupling to "local air" 936 may include selecting an upper injector port for the air supply. In particular, when removing the injector from the injector port 937 and installing the local air supply adapter to the injector port 938, the injector port 938 may at an uppermost position, as viewed axially (see FIG. 4). Moreover, where a plurality of injector ports are utilized, the plurality of injector ports may likewise be the uppermost injector ports in the combustor.

Next, the method 900 includes washing the gas turbine engine. In particular, washing the gas turbine engine includes cranking a compressor rotor assembly 940, pressurizing the offline buffer air 945, and spraying cleaner 950. Cranking the compressor rotor assembly 940 may include cranking all compressor rotor assemblies or cranking the compressor in general. Moreover, cranking the compressor rotor assembly 940, may include installing and operating a crank as described above, and/or operating a preinstalled crank (e.g. operating a starter without fuel supplied, operating a reconfigured electric generator, etc.), as described above. Also, cranking the compressor rotor assembly 940 may include first shutting off fuel to the combustor and then cranking the compressor. The compressor may be cranked sufficiently to draw cleaner through the gas turbine engine when the cleaner is sprayed.

According to one embodiment, the step 945 of pressurizing the offline buffer air may include supplying compressed air to the secondary air system. In particular, pressurizing the offline buffer air may include supplying compressed air to the buffer air path, the cooling air path, and/or the mixed air path of the secondary air system. For example, pressurizing the offline buffer air may include supplying compressed air to a seal of an intermediate and/or an end bearing assembly of the gas turbine engine via a secondary air system.

As discussed above, "local air" and "shop air" may be used separately or in combination. Where "local air" is used, cranking the compressor may further include cranking the compressor sufficiently to supply offline buffer air at pressure. In particular, the compressor may be cranked to a minimum predetermined rotation speed and/or output pressure (gauged off atmospheric pressure). For example, the compressor may be cranked to at least 20 percent of its normal operating speed. Also for example, the compressor may be cranked such that its maximum output pressure (PCD) is at least 0.5 psig (3.44 kPa). Also for example, the compressor may be cranked such that its maximum output pressure is at least 1.0 psig (6.89 kPa). Also for example, the compressor may be cranked such that its maximum output pressure is between 0.5 psig and 1.0 psig (3.44 kPa and 6.89 kPa).

Alternately, the compressor may be cranked such that the offline buffer air has sufficient pressure to inhibit egress of lubricants from "wet" areas, or ingress of contaminants during washing. In particular, losses associated with the particular gas turbine engine may be incorporated by cranking the compressor to a minimum differential pressure (gauged off the non-buffered side). For example, the compressor may be cranked such the differential pressure across all buffered interfaces is at least 0.25 psig (1.72 kPa), at least 0.5 psig (3.44 kPa), or between 0.25-1.0 psig (1.72-6.89 kPa). Also for example, the compressor may be cranked such the differential pressure between the wet side of a buffered bearing seal and its secondary air system buffer air path or secondary air system side is at least 0.25 psig (1.72 kPa), at least 0.50 psig (3.44 kPa), or between 0.25-1.0 psig (1.72-6.89 kPa) (gauged off the wet side). Also for example, the compressor may be cranked such the differential pressure between the primary air flow path of the turbine and the cooling air path of the secondary air system is at least 0.15 psig (1.03 kPa), at least 0.25 psig (1.72 kPa), or between 0.25-1.0 psig (1.72-6.89 kPa) (gauged off the primary air flow path side). Also for example, the compressor may be cranked such the differential pressure between the primary air flow path, upstream of the turbine, and a mixed air path across a labyrinth seal is at least 0.25 psig (1.72 kPa), at least 0.50 psig (3.44 kPa), or between 0.25-1.0 psig (1.72-6.89 kPa) (gauged off the primary air flow path side of the labyrinth seal).

According to one embodiment, the step 945 of pressurizing the offline buffer air may include keeping the combustor case bleed at least partially closed during wash. In particular, the combustor case bleed may be overridden or otherwise kept closed while cranking the compressor rotor assembly 940. For example, where the starter is used to crank the compressor, a command to open the combustor case bleed valve may be bypassed, or the combustor case bleed valve may be otherwise configured to inhibit primary air from bypassing the turbine while washing the gas turbine engine. Also for example, the combustor case bleed valve may be locked in a closed position during the washing of the gas turbine engine. An improvement on pressurizing the offline buffer air may result where the combustor case bleed is kept closed while washing the gas turbine engine and local air is used. Accordingly, this embodiment may be limited to embodiments where local air is used.

Where "shop air" is used, pressurizing the offline buffer air 945 may include supplying pressurized offline buffer air from the air supply to the pressurized air supply assembly. For example, a pressure control valve of the air supply may be opened, thereby pressurizing the coupled system. In addition the offline buffer air may be supplied at the same or similar pressure levels as above with "local air".

Spraying cleaner 950 includes delivering cleaner to the compressor or otherwise distributing cleaner into the compressor. In particular, cleaner (e.g., water, solvent, etc.) may be sprayed using the sprayer described above. For example, cleaner may be sprayed after the offline buffer air has been pressurized. Also for example cleaner may be sprayed after the compressor rotor assembly has been cranked.

In addition, a rinse may be sprayed 951. In particular, after delivering the cleaner, it may be rinsed from the compressor. As described above, the cleaner and the rinse may differ only in the timing of their delivery. Also, as described above, spraying the rinse 951 may include using same sprayer for both cleaner and rinse.

According to one embodiment, the method 900 may include collecting waste 960. In particular, the wash system may include a waste trap, as described above. Alternately, the gas turbine engine may include a series of fluid drains throughout. Accordingly, collecting waste 960 may include trapping and removing waste such as used cleaner, rinse, and other contaminants collected in waste trap, one or more drains, or otherwise, during washing the gas turbine engine.

According to one embodiment, the method 900 may include purging secondary air caps 970. In particular, the secondary air caps may include bleed vents as described above, and the bleed vents may be opened while under pressure. For example, at the end of the washing the compressor may continue to rotate and the bleed vents may be opened so as to permit debris, contaminant, rinse, etc. to escape. According to one embodiment, purging secondary air caps 970 may include leaving the bleed vents open while under pressure until minimal or no water leaves the bleed vents.

Finally, the method 900 ends with disassembling the wash system. In particular, disassembling the wash system includes removing compressor wash system hardware 980 and returning secondary air system to operating configuration 990. In particular, removing compressor wash system hardware 980 is substantially the reverse of installing the compressor wash system hardware, and returning secondary air system to operating configuration 990 is substantially the reverse of accessing the secondary air system. In addition, returning secondary air system to operating configuration 990 may include removing the crank or otherwise reconfiguring the crank. Also, returning secondary air system to operating configuration 990 may include reinstalling one or more injectors 991.

Embodiments of the presently disclosed wash system provide for an offline crank wash system for a gas turbine engine. In particular, one or more secondary air passages may be buffered, inhibiting egress of lubricants from "wet" areas, or ingress of contaminants during washing. Moreover, by drawing offline buffer air from the combustor, the amount of air needed (at least in larger engines) to buffer "intermediate" bearing assemblies and the associated cooling passages may be made practical, particularly where adequate shop air is not available. As a result, this buffering may reduce contamination and blockage from containments in the water wash. Moreover, with fewer drawbacks and a "cleaner" wash, it may be performed more frequently, improving performance and increasing intervals between manual washes.

The preceding detailed description is merely exemplary in nature and is not intended to limit the invention or the application and uses of the invention. The described embodiments are not limited to use in conjunction with a particular type of gas turbine engine. Hence, although the present embodiments are, for convenience of explanation, depicted and described as being implemented in a single spool axial gas turbine engine, it will be appreciated that it can be implemented in various other types of gas turbine engines, and in various other systems and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A method for washing a compressor in a gas turbine engine, the method comprising:
    removing an injector from an injector port of the gas turbine engine;
    installing a local air supply adapter to the injector port, the local air supply adapter being part of a pressurized air supply assembly, the gas turbine engine being an air supply;
    coupling the pressurized air supply assembly to a secondary air system of the gas turbine engine including coupling the pressurized air supply assembly to a buffer air path, the buffer air path leading to a first seal of at least one intermediate bearing assembly of the gas turbine engine;
    cranking a compressor rotor assembly of the gas turbine engine;
    supplying offline buffer air to the secondary air system from the air supply and via the pressurized air supply assembly; and
    delivering cleaner to the compressor.

2. The method of claim 1, wherein the supplying pressurized offline buffer air from the air supply to the pressurized air supply assembly includes keeping a combustor case bleed at least partially closed during the delivering cleaner to the compressor.

3. The method of claim 1, wherein the coupling the pressurized air supply assembly to the secondary air system of the gas turbine engine further includes
    coupling the pressurized air supply assembly to a cooling air path, the cooling air path leading to one or more cooling passages of at least one turbine rotor assembly of the gas turbine engine.

4. The method of claim 3, further comprising
    accessing a compressor port, including decoupling secondary air plumbing pneumatically coupled to the compressor port;
    installing a secondary air cap, including capping off the compressor port;
    accessing the buffer air path, including decoupling secondary air plumbing outside a combustor at a mating buffer air path mounting flange;
    accessing the cooling air path, including decoupling secondary air plumbing outside a combustor at a mating cooling air path mounting flange;
    wherein the coupling the pressurized air supply assembly to the buffer air path includes coupling the pressurized air supply assembly to the mating buffer air path mounting flange; and
    wherein the coupling the pressurized air supply assembly to the cooling air path includes coupling the pressurized air supply assembly to the mating cooling air path mounting flange.

5. The method of claim 4, wherein the secondary air cap includes a bleed vent, the method further comprising:
    rinsing the cleaner from the compressor; and
    purging the secondary air cap by opening the bleed vent after the rinsing the cleaner from the compressor.

6. The method of claim 1, wherein the coupling the pressurized air supply assembly to the secondary air system of the gas turbine engine includes coupling the pressurized air supply assembly to a buffer air path, the buffer air path leading one or more buffered seals of at least one end bearing assembly and at least one intermediate bearing assembly of the gas turbine engine.

7. The method of claim 6, further comprising coupling an air supply pneumatic couple to a shop air supply, the shop air supply being other than the gas turbine engine; and
    wherein the supplying offline buffer air to the secondary air system includes supplying offline buffer air to the one or more buffered seals of at least one end bearing assembly from the shop air supply via the air supply pneumatic couple.

8. The method of claim 1, wherein the cranking the compressor rotor assembly includes operating a starter of the gas turbine engine without fuel supplied, and further includes cranking the compressor to at least 20 percent of a normal operating speed of the compressor.

9. The method of claim 1, wherein the cranking the compressor rotor assembly includes cranking the compressor such that a maximum output pressure of the compressor is at least 0.5 psig, as gauged off atmospheric pressure.

10. The method of claim 1, wherein the local air supply adapter includes an air supply extension;
    wherein the installing the local air supply adapter to the injector port includes extending the air supply extension to or into a combustion chamber; and
    wherein the supplying offline buffer air to the secondary air system includes supplying offline buffer air from the combustion chamber.

11. The method of claim 1, wherein the injector port is in the upper half of a combustor of the gas turbine engine.

12. A method for washing a gas turbine engine, the gas turbine engine including a compressor, a combustor, and a turbine, the method comprising:
    removing an injector from an injector port;
    installing a local air supply adapter to the injector port;
    cranking the compressor of the gas turbine engine;
    supplying compressed air to a cooling air path of the gas turbine engine via the secondary air system;
    supplying compressed air to a buffered seal of an intermediate bearing assembly of the gas turbine engine via the secondary air system;
    distributing a cleaner into the compressor; and
    supplying compressed air to a secondary air system of the gas turbine engine from the local air supply adapter.

13. The method of claim 12, further comprising:
    coupling an air supply pneumatic couple to a shop air supply, the shop air supply being other than the gas turbine engine;
    supplying compressed air to a mixed air path of the gas turbine engine via the secondary air system; and wherein the compressed air is supplied from both the local air supply adapter and the air supply pneumatic couple.

14. The method of claim 12, wherein the cranking the compressor of the gas turbine engine includes operating a starter of the gas turbine engine such that the compressor is rotated to at least 20 percent of a normal operating speed of the compressor, and such that a maximum output pressure of the compressor is at least 0.5 psig, as gauged off atmospheric pressure.

15. The method of claim 12, further comprising:
   accessing a compressor port, including decoupling secondary air plumbing pneumatically coupled to the compressor port;
   installing a secondary air cap, including capping off the compressor port, the secondary air cap including a bleed vent;
   rinsing the cleaner from the compressor; and
purging the secondary air cap by opening the bleed vent after the rinsing the cleaner from the compressor.

* * * * *